Aug. 2, 1927.
H. L. HUNT
1,637,904
PITMAN BOXING
Filed Aug. 10, 1926
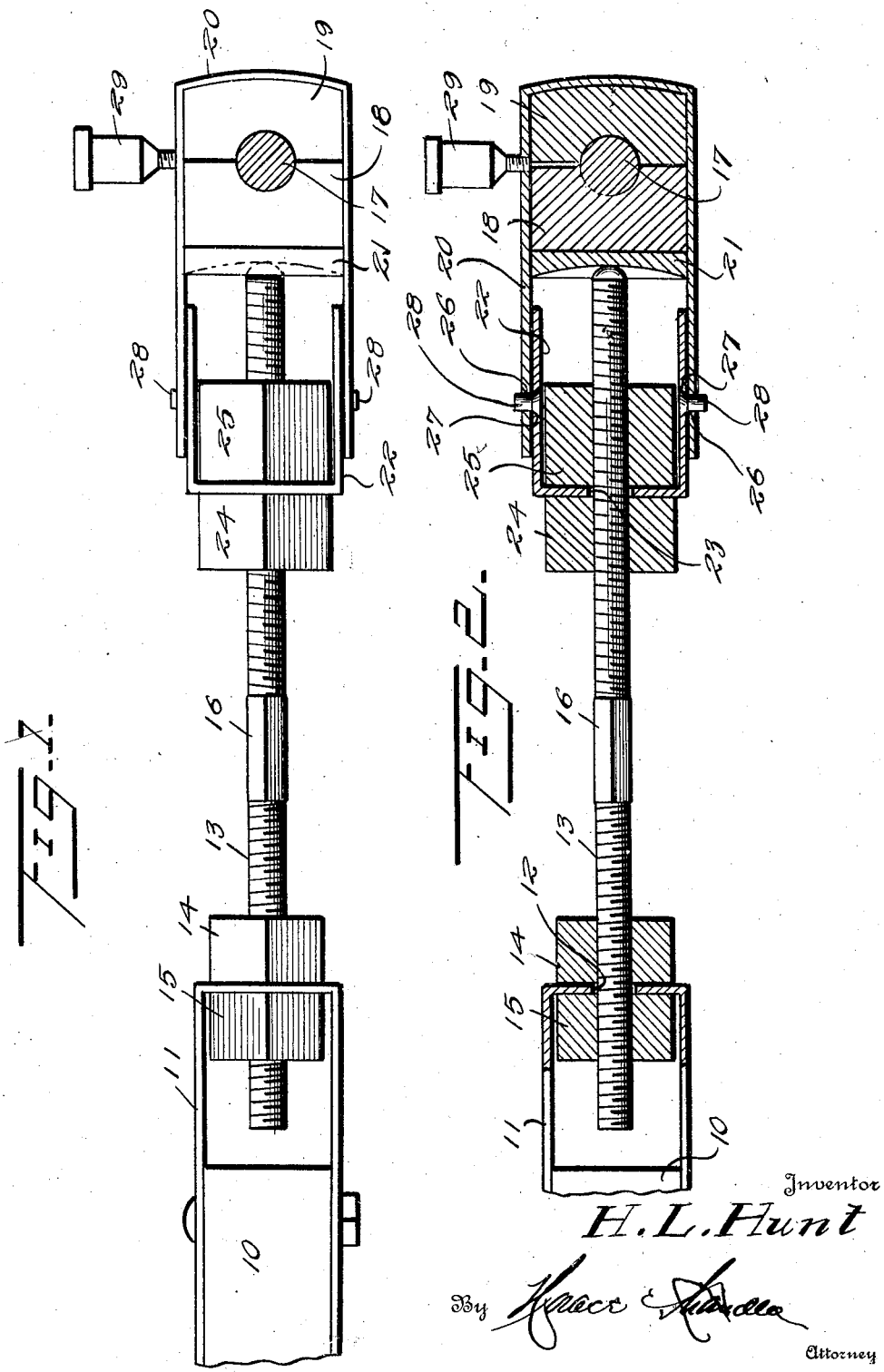
Inventor
H. L. Hunt Patented Aug. 2, 1927.

1,637,904

UNITED STATES PATENT OFFICE.

HARRY L. HUNT, OF BIGELOW, MISSOURI.

PITMAN BOXING.

Application filed August 10, 1926. Serial No. 128,486.

This invention relates to new and useful improvements in pitmen, and particularly to the boxings by means of which they are connected to the wrist pins of the driving shafts.

One object of the invention is to provide a device of this character wherein the boxing is capable of being adjusted to compensate for wear.

Another object is to provide a device of this character wherein the pitman is capable of being adjusted to take up wear, and loose play, at the boxing end of the rod, and at the point of connection with the sickle bar.

Another object is to provide a device of this character which is simple in construction, capable of being applied to the pitmen now in use, and which can be manufactured at a comparatively low cost.

Other objects and advantages will be apparent from the following description when taken in connection with the accompanying drawing.

In the drawing:

Figure 1 is an elevation of a pitman and boxing, made in accordance with the present invention.

Figure 2 is a vertical longitudinal central sectional view through the device.

Referring particularly to the accompanying drawing, 10 represents a portion of the pitman, which has the strap 11 secured on one end. The bight portion of this strap is provided with an opening 12, through which is disposed one end of an oppositely threaded rod 13. Engaged on this rod 13, at opposite sides of the bight portion, are the adjusting and retaining nuts 14 and 15. The intermediate portion of this rod 13 is provided with a wrench engaging portion 16, by means of which the rod may be turned.

Embracing the wrist pin 17, are the sections 18 and 19, of the bearing, said sections being properly confined within a yoke-shaped frame 20. A block 21 is slidably supported in the frame 20 and has a flat face bearing against the section 18, while its opposite face is concave for engagement by the adjacent end of the rod 13. A second yoke 22 has its arms disposed between the arms of the yoke 20, and in contact with the inner faces thereof. The bight portion of the yoke 22 is formed with an opening 23 through which extends the adjacent end of the rod 13. Nuts 24 and 25 are threaded on the said end of the rod, inwardly and outwardly of the bight portion of the yoke 22, and are adapted to be turned against said bight portion to hold the rod against rotation in either direction, and to maintain the said end of the rod in firm engagement with the concave face of the block 21. In the arms of the yoke 20 are formed openings 26, and in the arms of the yoke 22 are also formed openings 27. In the openings 27 are disposed the removable pins 28, the inner ends of which are formed with heads countersunk into the the inner faces of the arms of the yoke 22, while the outer ends extend through the openings 26, of the yoke 20. Thus the yoke 22 is pivotally connected with the yoke 20. It will be noted that the nut 25 is of such dimensions that two of its opposite side faces overlie the heads of the pins 28 to hold the same within the openings of the arms of the yoke 22.

On the upper side of the frame 20 is an oil cup 29, which feeds oil to the wrist pin and bearing block sections 18 and 19.

When the wrist pin and bearing blocks 18 and 19 wear to such an extent that a loose motion is present, the nuts 14 and 24 are turned away from the bight portions of the strap 11, and of the yoke 22, respectively, whereby to permit the rod 13 being moved against the concave face of the block 21. The pressure of the rod 13 against the block 21 forces the section 18 against the wrist pin, and upon turning the nut 24 up against the bight portion of the yoke 22 the yoke frame 20 will be drawn inwardly whereby to pull the bearing section 19 against the other side of the wrist pin. The nut 24 is then turned up tightly against the bight of the yoke 22, whereby to hold the bearing sections in proper embracing engagement with the wrist pin. The nuts 14 and 15 are then manipulated to firmly clamp the strap bight therebetween, and draw the pitman rod up to the desired position.

What is claimed is:

The combination with a yoke-shaped frame of a pitman box, of a yoke having its arms apertured and disposed between the arms of the frame, a pitman rod having a threaded end engaged through the bight of said yoke, bearing blocks in the frame, a block in the frame bearing against one of said bearing blocks, the end of the pitman rod bearing against said block, adjustable clamping means on the pitman engaged with the bight of the yoke, and removable pivot members in the openings of the yoke and in the arms of the frame, said pivot members being headed and retained in position by one of said clamping means.

In testimony whereof, I affix my signature.

HARRY L. HUNT.